United States Patent [19]
Toldi et al.

[11] Patent Number: 4,504,879
[45] Date of Patent: Mar. 12, 1985

[54] DISC DRIVE ARRANGEMENT

[75] Inventors: George Toldi, Santa Clara; Anil Nigam, Cupertino; Ronald A. Crain, San Jose, all of Calif.

[73] Assignee: SyQuest Technology, Fremont, Calif.

[21] Appl. No.: 385,104

[22] Filed: Jun. 4, 1982

[51] Int. Cl.³ .................. G11B 5/54; G11B 17/02
[52] U.S. Cl. ............................. 360/105; 360/97
[58] Field of Search ............ 360/105, 103–104, 360/97–99, 137

[56] References Cited

U.S. PATENT DOCUMENTS

| | | | |
|---|---|---|---|
| 3,815,150 | 6/1974 | Stoddard et al. | 360/97 |
| 4,380,782 | 4/1983 | Hirose et al. | 360/99 |
| 4,392,165 | 7/1983 | Wright | 360/105 |
| 4,396,963 | 8/1983 | Wright | 360/105 X |
| 4,419,703 | 12/1983 | Gruczelak et al. | 360/97 |

Primary Examiner—John H. Wolff
Attorney, Agent, or Firm—Fliesler, Dubb, Meyer & Lovejoy

[57] ABSTRACT

A disc drive arrangement for accessing information from and recording information onto a disc retained in a cartridge comprises a housing, a door, at least one reading and recording head, a carriage for mounting and transporting the head, and linkage operatively connecting the door to the carriage for urging said head away from the cartridge when the door is opened. As this linkage is mechanical, the head can always be urged from the disc even during power failure so that if the cartridge is removed, the head and the information on the disc are not damaged.

24 Claims, 8 Drawing Figures

DISC DRIVE ARRANGEMENT

DESCRIPTION

1. Technical Field

The present invention relates to a disc drive arrangement for use with a computer for information storage and retrieval.

2. Background Art

Over the past several years the number and variety of disc drives which can store and retrieve information on a hard disc have increased many fold. This increase has been due to the increase in computer and microprocessor use to accomplish more tasks. There are several disadvantages with the prior art devices. There include the following.

First, with the greater use of disc drives, there is a need for smaller drives that can replace, for example on a two to one basis, the present drives. If the same amount of information can be stored in half the space, the system becomes more efficient.

Another disadvantage with present disc drives is the fact that the placement of the recording heads relative to the disc is generally accomplished by a solenoid. When there is power failure in the system, the solenoid arrangement becomes inoperative. If there is sensitive information on the disc and the operator wishes to remove the disc, the procedure is generally to insert a screwdriver type object into a hole provided in the disc drive in order to release the solenoid and remove the disc. Many times this arrangement does not work, with resultant damage to either the recording heads or the loss of information from and damage to the disc or both.

Still another disadvantage with prior art disc drives is the fact that the heads are generally mounted on a flexure which allows the heads to be placed onto the disc preparatory to the reading or recording and later removed from the disc. These flexures are subject to fatigue, due to the delicate nature of their construction, from this repeated placement on and removal from the disc.

Still a further disadvantage with prior art devices is that generally a pin is used to prevent improper insertion of the cartridge into the disc drive. This pin is itself vulnerable to bending. The pin can also pierce through the plastic. If either of these events occur, the reading and writing heads can be destroyed.

The present invention is directed to overcoming one or more of the problems as set forth above.

DISCLOSURE OF INVENTION

In one aspect of the invention, a disc drive arrangement for accessing information from and recording information on to a disc retained in a cartridge comprises a housing, a door, means for mounting the door to the housing, at least one reading and recording head, and a carriage means for mounting and transporting said head. The disc drive arrangement further includes means for movably mounting said carriage to said housing, motor means for positioning said carriage relative to said housing and a linkage means operably connecting said door to said carriage for removing said head from the disc when the door is opened and for moving said carriage in a direction away from the cartridge as the door is opened.

In another aspect the linkage means includes a cam means for caming said head outwardly from the disc as the door is opened.

In yet another aspect, the disc drive arrangement further includes a spindle means for receiving and driving the disc and means for receiving said cartridge which means are operatively connected to the linkage means. The receiving means includes means for urging said disc on to the spindle and then urging the cartridge away from the spindle as the doors close.

In yet another aspect of the invention the disc drive arrangement includes a cartridge ejector means for ejecting the cartridge from the housing when the door is opened.

In yet another aspect of the invention the carriage means includes a base, a first flexure secured to the base, a platform secured to the first flexure, a second flexure secured to the platform and the head secured to the second flexure. The arrangement includes means for camming said platform away from said base preparatory to the placement of the head on the disc.

In yet another aspect of the invention, the disc drive arrangement includes a means adapted for inserting into the cartridge for opening a door in the cartridge and for preventing the complete insertion of the cartridge into the housing if the cartridge is incorrectly oriented with respect to the housing in order to protect the reading and recording head.

From the above it can be seen that the present invention solves many of the problems associated with the prior art devices in that due to the carriage arrangement the fatigue problem associated with prior art flexures is greatly reduced or eliminated. Also as the head can be cammed away from the disc, and due to redesigned cartridge arrangement which is the subject of a copending application, the head can be inserted through the top of the cartridge and then placed on the disc. With such an arrangement not only can the cartridge be at least half the size of prior art cartridges, but also the disc drive arrangement can be reduced to at least half the size of prior art disc drive arrangements.

Further due to the linkage arrangement, should a power failure occur, when the door is opened, the head and carriage are automatically extracted from the cartridge so that the cartridge can be removed without damage to the cartridge or the head.

Also preparatory to a cartridge being inserted into the disc drive, the door is opened and simultaneously the carriage is urged away from the door and cartridge and the heads are cammed up so that no damage is done to the head. Still further the ejector means, automatically ejects the cartridge when the door is opened.

BEST MODE FOR CARRYING OUT THE INVENTION

Figure 1:
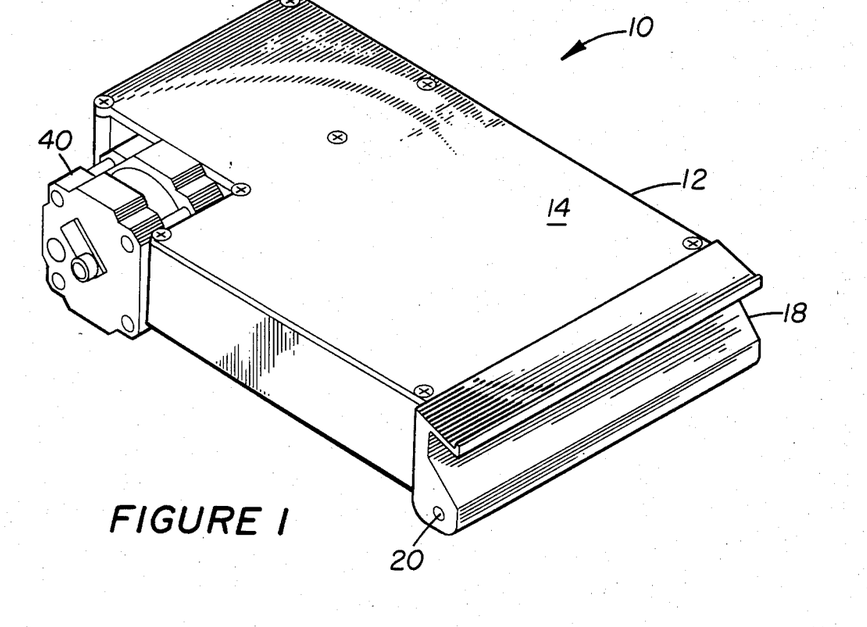
FIG. 1 is a perspective view of an embodiment of a disc drive arrangement of the invention.
Figure 2:
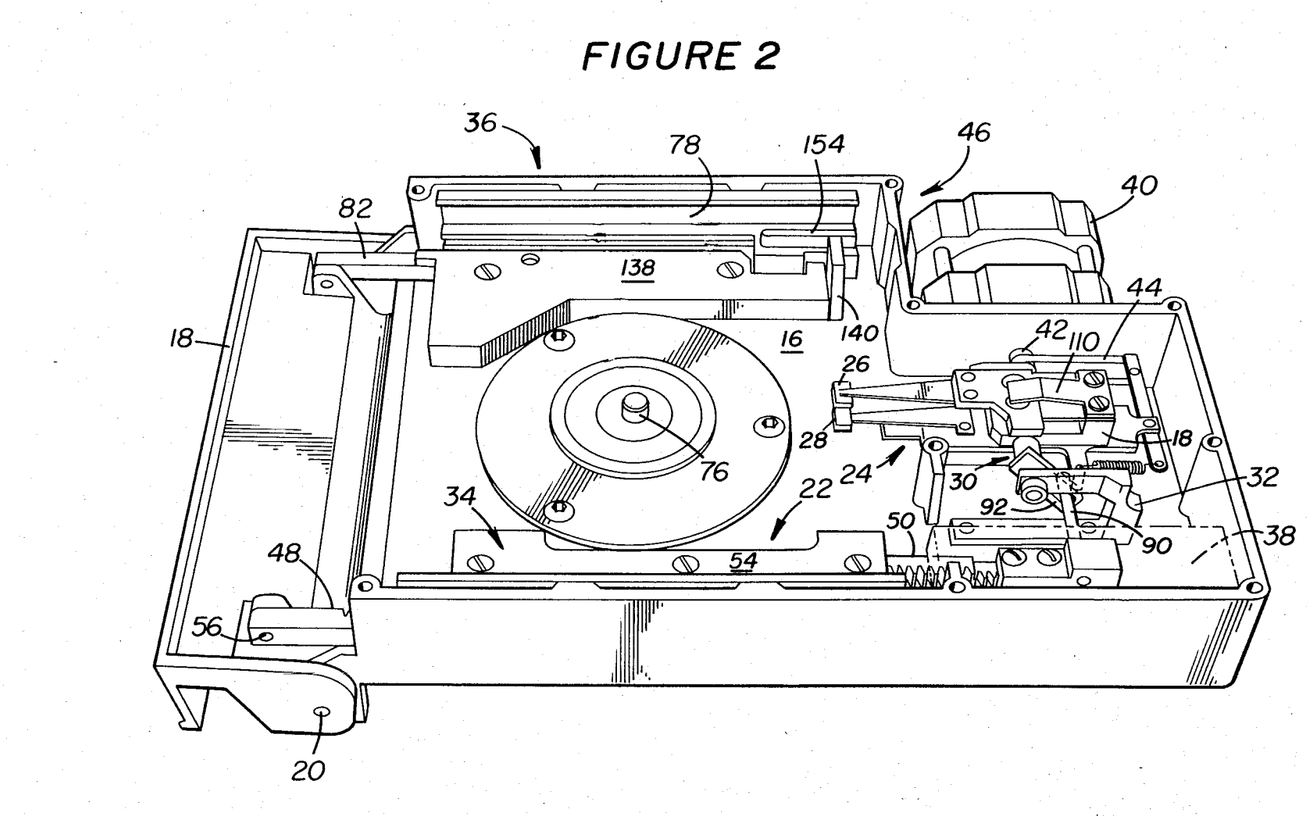
FIG. 2 is another perspective view of the disc drive arrangement of FIG. 1 with the door opened and the top thereof removed.

With reference to the figures and in particular to FIG. 1 an embodiment of the disc drive arrangement of the invention is depicted and denoted by numeral 10. Disc drive arrangement 10 includes a housing 12 having a cover 14 and a floor 16 (FIG. 2). It should be understood that the electronic and logic circuitry (not shown) is located below floor 16 and is the subject of a copending application. Housing 12 includes a door 18 which is pivotally secured thereto along pivotal axis 20.

In FIG. 2 the cover 14 of the disc drive arrangement has been removed and the door 18 has been pivoted to an open position. The disc drive arrangement 10 further includes a linkage means 22 for operatively connecting the door 18 to a carriage 24 which mounts upper and lower recording heads 26 and 28. It is to be understood that although heads 26 and 28 are referred to as recording heads, they can also read information stored on the disc. The linkage means is for lifting the head from the disc 25 and urging the cartridge away from the disc drive cartridge 27, shown in phantom in FIGS. 6A and 6B, when the door is opened. The disc drive arrangement further includes a cam arrangement 30 and mount 32 therefor. The arrangement 10 also includes cartridge mounting and positioning means 34 and 36 which are actuated when the door 18 is opened and closed.

Figure 3:
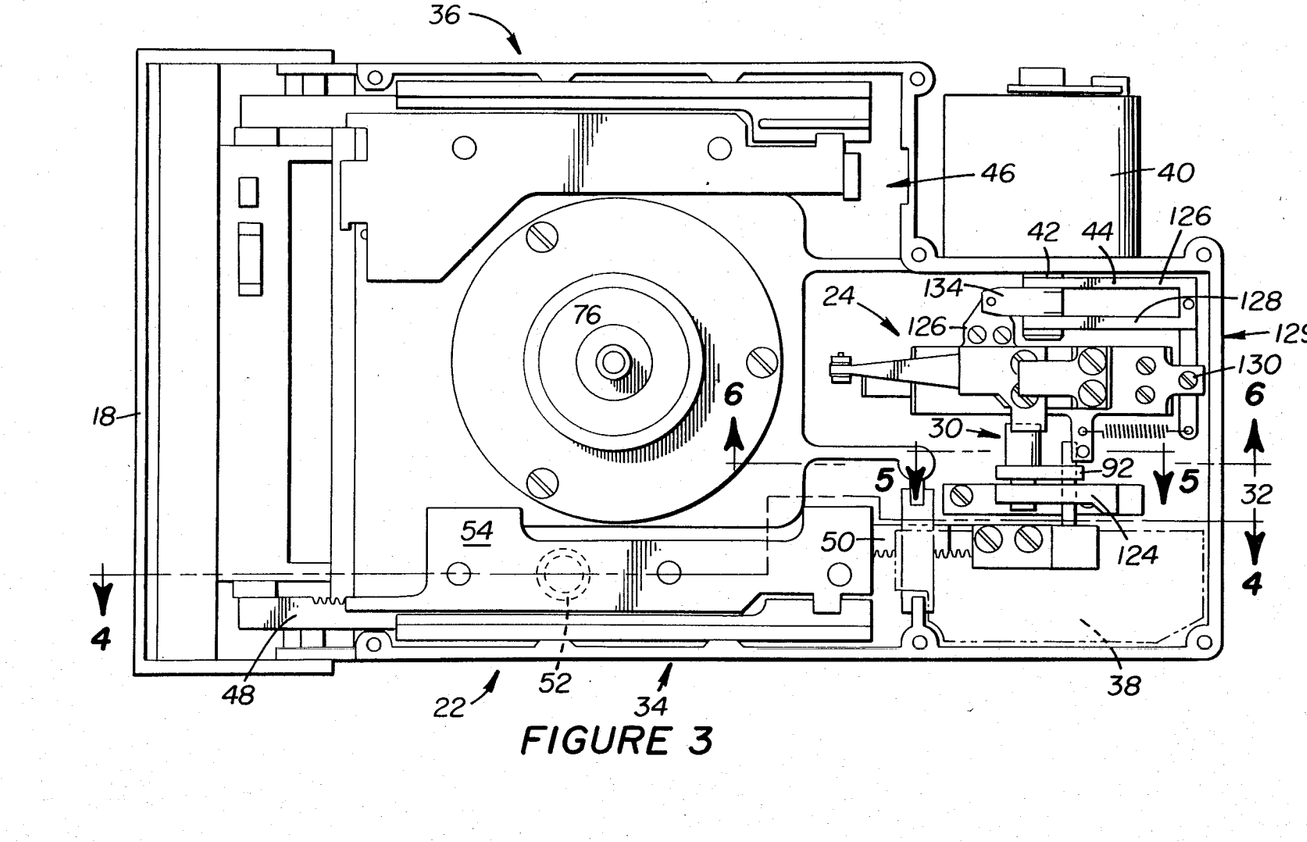
FIG. 3 is a plan view of the embodiment of FIG. 1 with the door opened and the top removed.

The disc drive arrangement 10 additionally includes an air filter and fan 38, shown in phantom, to remove contaminants from the inside of the housing 12. The arrangement 10 includes a stepper motor 40 which has a spindle 42. The spindle 42 is operatively connected to the carriage 24 by a belt means 44. An ejector means 46 (FIGS. 2, 3, 7) is mounted with the cartridge mounting and positioning means 36. A more detailed description of the above components of the disc drive arrangement 10 follows.

Figure 4:
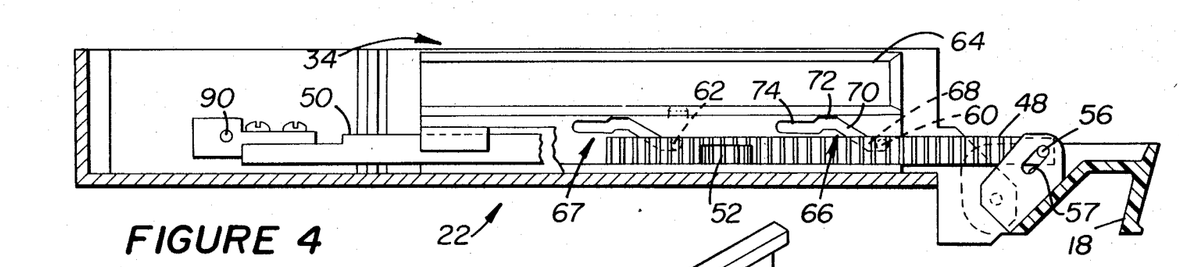
FIG. 4 is a cross-sectional view taken through line 4—4 in FIG. 3.
Figure 5:
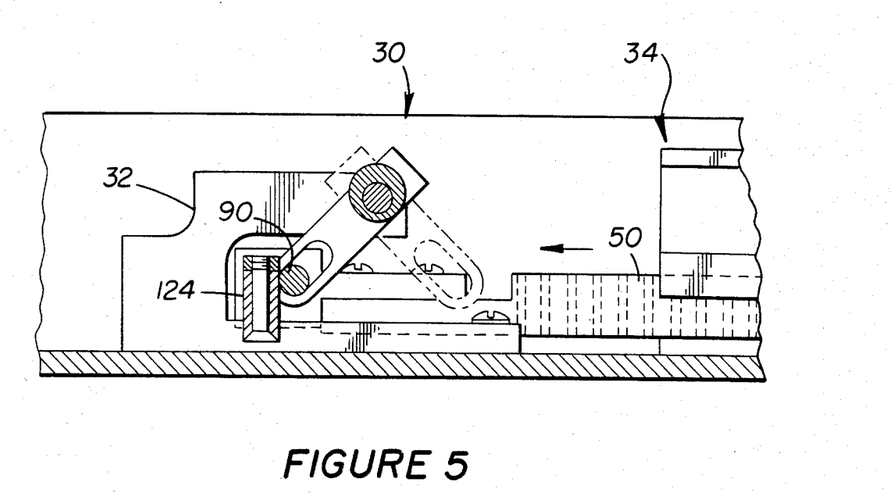
FIG. 5 is a cross-sectional view taken through line 5—5 in FIG. 3.

With respect to the linkage means 22 and the cartridge mounting and positioning means 34, which are additionally partially shown in FIG. 4, the cartridge mounting and positioning means indludes first and second racks 48 and 50 and pinion 52 which operatively connects first and second racks 48 and 50. First and second racks 48 and 50 and pinion 52 are provided in mount 54 which is secured to the floor 16 of the housing 12. Additionally first rack 48 includes a pin 56 which is mounted in a slot 57 defined by door 18. Pins 60 and 62 extend from first rack 48 and are used to actuate the cartridge mounting and positioning means 34. Cartridge mounting and positioning means 34 includes a longitudinal channel 64 which can accept an edge of the cartridge 27. Under channel 64 substantially Z-shaped slots 66,67 are defined into which pin 60 and 62 are disposed. Z-shaped slot 66 includes a first substantially horizontal portion 68, a second ramped portion 70 which ends in a spiked portion 72 and a second substantially horizontal portion 74. Slot 67 is simultaneously configured. Slots 66,67 define a motion of the cartridge as the door 18 is closed and the cartridge is placed in the operative position. The spiked portion 76, as will be described more fully hereinbelow, is to insure that the cartridge is properly seated on the drive spindle 76 which extends through the floor 16. It is to be understood that cartridge mounting and positioning means 36 has a similar longitudinal channel such as channel 64 and a similar Z-shaped slots such as slots 66,67 these being defined by numerals 78 and 80,81 respectively. Further a longitudinal member 82 is slidingly pinned through a slot 84 which is identical to slot 58 and which is also defined in door 18. Pins 86 and 88 extend from longitudinal member 82 into slot 80,81.

It is to be understood that as the door opens that rack 48 is pulled out of housing 12 toward door 18 and that rack 50 is pushed away from door 18 further into housing 12. At the end of rack 50 is a mount for an elongated pin 90 which is substantially parallel to floor 16 and perpendicular to second rack 50. Pin 90 engages the cam arrangement 30 and the carriage 34 as described hereinbelow.

Cam arrangement 30 includes the above-identified mounting bracket 32. Arm 92, which is pivotally mounted at the top of mount 32 at pivot point 94, includes an elongated slot 96 at the lower end thereof through which pin 90 is disposed. Also secured to arm 92 and pivotable about pivot point 94 is a cam 98. Cam 98 is used to position the head 26 as will be described hereinbelow.

Figure 6A:
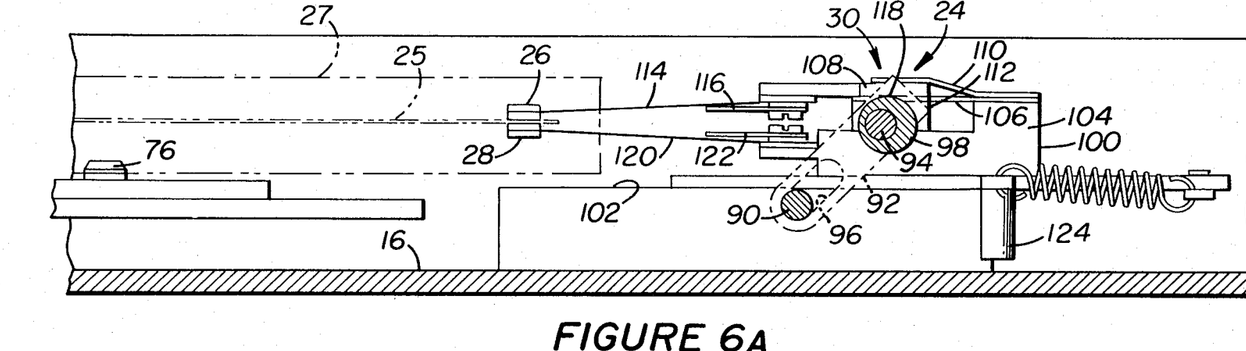
FIG. 6A is a cross-sectional view taken through line 6—6 in FIG. 3 with the upper recording head cammed up.
Figure 6B:
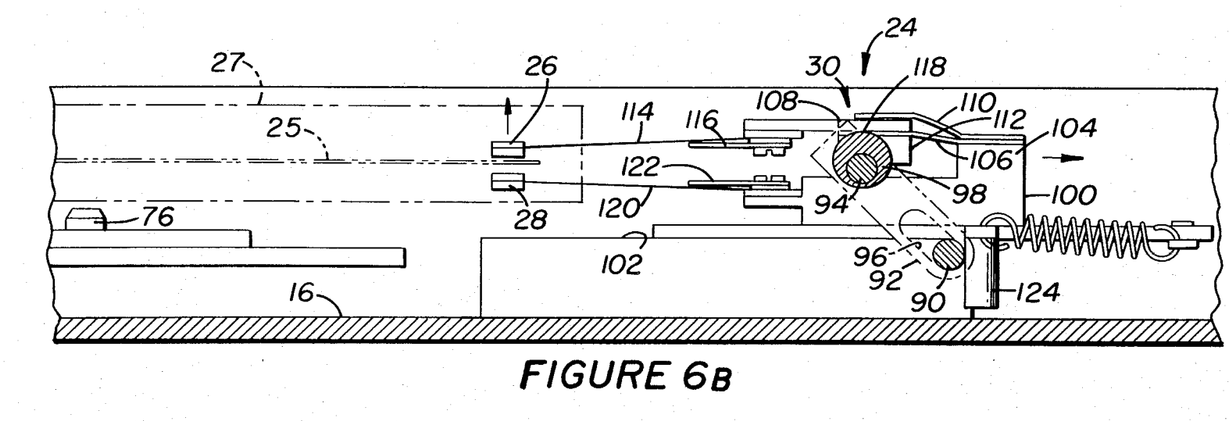
FIG. 6B is a cross-sectional view taken through line 6—6 in FIG. 3 with the upper recording head cammed down.

In FIG. 6A and 6B carriage 24 is depicted and includes a base 100 which is slidably mounted upon a track 102 which is secured to the floor 16 of the housing 12. Base 100 includes an upstanding post 104 to which is secured a first flexure 106. First flexure 106 is secured at its opposite end to a platform 108. A spring 110 is also secured to post 104 above flexure 106 and is used to urge the platform 108 downwardly. A stop 112 is secured to platform 108 to define a minimum separation between the platform and a portion of the base immediately therebelow. A second flexure 114 is secured to platform 108 at the end opposite to the first flexure 106. At the end of flexure 114 the first or upper head 26 is secured in a manner which is customary in the trade. The flexure 114 is generally biased towards the base 100 and a stop 116 is secured to the platform 108 outward of the flexure 114 to limit the movement of the flexure 114 toward the base. Extending from platform 108 is a cam follower 118 which rides upon and follows cam 98. Secured to base 100 substantially immediately below the second flexure 114 is a third flexure 120 to which is mounted the second or lower head 28. Third flexure 120 is biased upwardly. Mounted to the base 100 outboard of the third flexure 120 is another stop 122 which limits the movement of the flexure 120 and the head 28 toward the head 26 which is located immediately thereabove. It is to be understood that when a cartridge with a disc is inserted into the disc drive arrangement 10 that the head 26 can be placed adjacent the upper side thereof and the head 28 adjacent the lower side thereof so that reading and recording can be accomplished on both sides of the disc. Extending from base 100 is a stop 124 which can be engaged by and urged rearwardly by pin 90 when door 18 is opened as will be discussed more fully hereinbelow.

The belt means 44, (FIGS. 2 and 3) includes essentially two parallel and flexible members 126 and 128 which are secured to the rear portion of base 100 by lever and spring arrangement 129 which is pivoted at point 130 to base 100. A tongue member 134 of belt means 44 is wrapped around the spindle 42 and disposed between members 126 and 128 and secured at its end to a member 126 which is secured to base 100. The turning of spindle 42 in a clockwise or counterclockwise manner causes the belt means 44 to move therewith causing the carriage 100 to slide forwardly and rearwardly over track 102. This action will position the heads 26 and 28 as required relative to the disc.

Figure 7:
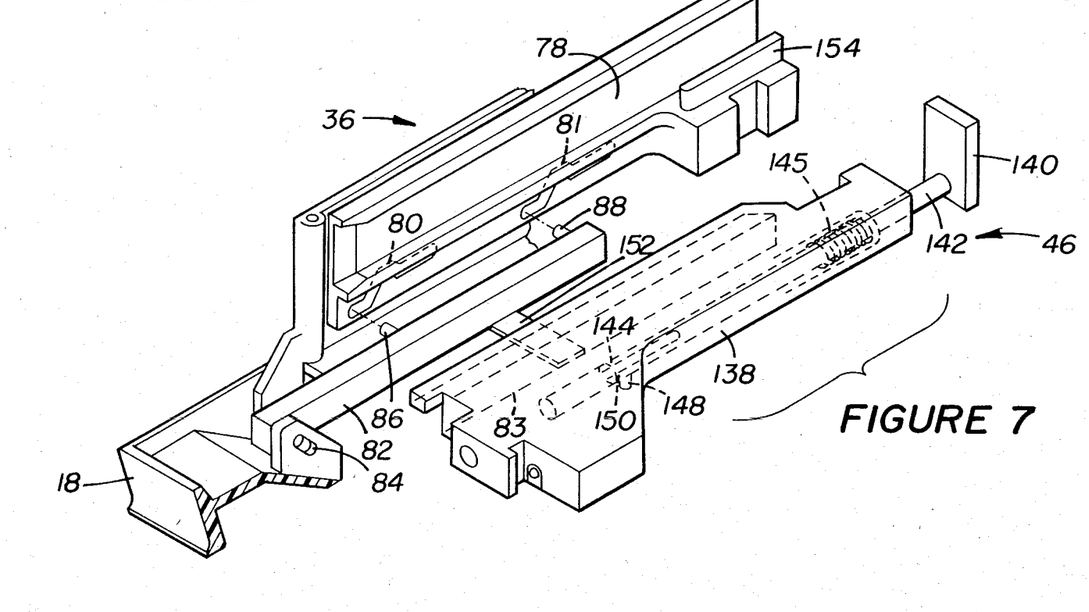
FIG. 7 is an exploded perspective view of the ejector means of the invention.

The ejector means 46 is mounted in a platform 138 which mounts the elongated member 82, which is linked to the door 18 in groove 83. Ejector means 46 includes an ejector plate 140 which is mounted on an elongate rod 142 which has a bifurcated distal end 144 which has a button 146 affixed to the lower elements of bifurcated end 144. Rod 142 fits in a bore of platform 138 and button 148 can drop through an aperture 150 which is substantially perpendicular to the bore through which the rod 142 is disposed. When a cartridge is inserted into the disc drive arrangement 10 the ejector plate 140 is urged rearwardly causing the detent 146 to drop into aperture 150. There is a arm 152 extending from longitudinal member 82 which moves forward when door 18 is opened and trips button 148 releasing it from aperture 150. Spring 145 then urges ejector plate 140 toward platform 138 causing the cartridge to be urged out of the disc drive arrangement 10.

Mounted on cartridge mounting and positioning means 34 adjacent stepper motor 40 and substantially upstanding from means 34 is an elongate member 154 which penetrate an aperature (not shown) in the cartridge (not shown) to actuate the door opening mechanism thereof. If the cartridge is inserted incorrectly so that the elongate member does not go into the aperture, the cartridge cannot be inserted fully into the disc drive arrangement 10 and thus does not come in contact with and potentially damage the heads 26 and 28.

INDUSTRIAL APPLICABILITY

The operation of the above invention is as follows. Initially the door 18 of the disc drive arrangement 10 is opened with the simultaneous urging of the carriage 24 rearwardly due to the engagement of the pin 90 of the linkage means 22 with stop 124 of a carriage 24 and the upward camming of upper head 26. With the door fully down, the carriage 24 is in its full rearward position (FIG. 6B) and upper head 26 is in its full upward position so that with the insertion of the cartridge into the appropriate channels of the cartridge mounting and positioning means 34 and the heads are not damaged. When the cartridge has been slid past elongate member 154 the doors thereof opens. As the cartridge is fully inserted into the disc drive arrangement 10, the cartridge pushes the ejector plate 140 rearwardly locking the detent 148 in aperture 150. The heads 26,28 enter the cartridge through doors (not shown) in the upper and lower surfaces of the cartridge. Next the door 18 is closed bringing the pin 90 forwardly disengaging it from the carriage 24 and camming upper head 26 downwardly (FIG. 6A) onto the disc. As this is happening the cartridge is lowered by cartridge mounting and positioning means 34 and 36 onto lower head 28 and until it is urged on to spindle 76. At this point the pins inserted into the Z-shaped slots are at approximately the spike thereof. As the door is finally closed the pins become removed from the spike and progress along the horizontal portion 74 of the Z-shaped slots 66. When this occurs the cartridge is lifted somewhat relative to the disc which is firmly engaged with the spindle so that the disc can now spin freely with respect to the cartridge as the spindle turns. The stepper motor then can drive the carriage 24 forwardly.

It is to be understood that due to the above camming action and due to the design of the cartridge so that the heads can enter the upper and lower surfaces thereof (see co-pending U.S. application assigned to SyQuest entitled Disc Drive Cartridge Arrangement filed on June 4, 1982 and given patent application Ser. No. 384,927) the cartridge and also the disc drive arrangement 10 can be much thinner than prior art devices. Further due to the fact that the first flexure, which is heavy, is cammed and not the second flexure fatigue associated with the movement of the flexure in prior art devices is not a problem.

To remove the cartridge under either a power on or power failure condition, the door 18 is pulled open with the simultaneous movement of pin 90 rearwardly to urge the carriage rearwardly and cam the upper head 26 upwardly from the disc while urging the cartridge and disc upwardly from the lower head 28. The ejector plate 140 simultaneously urge the cartridge out of the disc drive arrangement 10. Thus it is to be understood that even if the power is off, the cartridge and disc can be easily and conveniently removed from the disc drive arrangement without damage to the heads or the information stored on the disc.

Other aspects, objects, and advantages of the invention can be obtained from a study of the drawings, the disclosure and the appended claims.

I claim:
1. A disc drive arrangement for accessing information from and recording information onto a disc retained in a cartridge comprising:
   a housing;
   a door;
   means for mounting the door to the housing so that said door can be moved between an opened and a closed position;
   at least one head;
   a carriage means for mounting and transporting said head;
   means for movably mounting said head to said carriage;
   means for movably mounting said carriage to said housing;
   motor means for positioning said carriage relative to said housing;
   linkage means directly connecting said door to said carriage for urging said head away from the cartridge responsive to the moving the door to the opened position.
2. The disc drive arrangement of claim 1 including said linkage means for additionally urging said carriage aay from the cartridge as the door is opened.
3. The disc drive arrangement of claim 2 wherein:
   said linkage means includes a first rack which moves forwardly as said door is opened, a stationary pinion, a second rack which moves rearwardly when said door is open, and a pin means extending from said second rack for engaging and urging said carriage away from the cartridge.
4. The disc drive arrangement of claim 1 including:
   another head positioned on the opposite side of the disc from the one head; and
   means for urging the cartridge away from the another head as the door is opened.
5. The disc drive arrangement of claim 1 including:
   said linkage means for simultaneously urging said carriage away from the cartridge as the door is opened;

another head positioned on the opposite side of the disc from the one head; and means for urging the cartridge away from the another head as the door is opened.

6. The disc drive arrangement of claim 1 wherein:
said linkage means includes means for engaging and urging said carriage away from said cartridge as said door is opened, which means disengages from said carriage as said door is closed.

7. The disc drive arrangement of claim 1 wherein said linkage means includes:
cam means for camming said head away from a disc of said cartridge.

8. The disc drive arrangement of claim 7 wherein said linkage means including:
a mount secured to said housing;
an arm pivotally mounted to said mount so as to pivot as the door moves relative to said housing; and
said cam means mounted to said arm.

9. The dics drive arrangement of claim 1 including:
spindle means for receiving and driving the disc;
means for receiving said cartridge and means for operatively connecting said receiving means to said linkage means;
said receiving means includes means for urging said disc onto said spindle means and then urging said cartridge away from said spindle means as said door is closed.

10. The disc drive arrangement of claim 9 wherein said carriage means includes:
a third flexure mounted to said base;
a second head mounted to said flexure, wherein said first and second heads face each other and said third flexure is biased toward the first head; and
means for limiting the movement of the third flexure and second head toward the first head.

11. The disc drive arrangement of claim 1 including a cartridge ejector means for ejecting the cartridge from said housing when said door is opened, which ejector means includes:
an ejector plate which is displaced when the cartridge is inserted into the housing;
means for biasing said ejector plate against said cartridge;
means for lockingly positioning said ejector plate in a displaced position;
means for unlocking the positioning means as said door is opened so said ejector plate and biasing means urges the cartridge from said housing.

12. The disc drive arrangement of claim 11 wherein said lockingly positioning means includes a button and an aperture through which the button can be selectively disposed, and wherein said unlocking means is operably secured to said door and includes arm means for urging the button out of the aperture as said door is opened.

13. The disc drive arrangement of claim 1 wherein said carriage means includes:
a base;
a first flexure secured to said base;
a platform secured to said first flexure;
a second flexure secured to said platform;
and wherein said head is secured to said second flexure;
said linkage means including means for camming said platform away from said base as the door is opened.

14. The disc drive arrangement of claim 13 wherein said carriage means include:
means for biasing said platform toward said base; and wherein said second flexure is biased toward said base, means for limiting the movement of said second flexure and head toward said base.

15. The disc drive arrangement of claim 14 wherein said carriage means includes a stop means secured to said platform for defining a minimum distance between the platform and the base.

16. The disc drive arrangement of claim 13 wherein said carriage means includes:
a third flexure mounted to said base;
a second head mounted to said third flexure wherein said first and second heads face each other; and
means for limiting the movement of the third flexure and second head toward the first head.

17. The disc drive arrangement of claim 1 including means adapted for opening a door in the cartridge to allow the head access to the disc.

18. The disc drive arrangement of claim 17 wherein said mounting means includes:
means for biasing said platform toward said base; and
wherein said second flexure is biased toward said base, means for limiting the movement of said second flexure and head toward said base.

19. The disc drive arrangement of claim 17 wherein said cartridge door opening means includes a fixed member upstanding in said housing which penetrates the cartridge as it is inserted into said housing.

20. The disc drive arrangement of claim 19 wherein said mounting means includes a stop means secured to said platform for defining a minimum separation between the platform and the base.

21. The disc drive arrangement of claim 1 wherein the cartridge includes an aperture which allows access to a cartridge door opening mechanism, said housing including:
means adapted for inserting into said aperture to open said cartridge door and for preventing the complete insertion of the cartridge in the housing when the cartridge aperture is incorrectly orientated with respect to said housing to protect the head.

22. The disc drive arrangement of claim 1 wherein said linkage means is entirely mechanical.

23. A disc drive arrangment for accessing information from and recording information onto a disc retained in a cartridge comprising:
a housing;
a door;
means for mounting said door to said housing so that the door can be moved between an opened and a closed position;
at least one head;
means for movably mounting said head to said housing;
said mounting means including:
a base;
a first flexure secured to said base;
a platform secured to said first flexure;
a second flexure secured to said platform;
and wherein said head is secured to second flexure;
said disc drive arrangement including means operably connecting said door to said platform for camming said platform away from said base preparatory to the movement of one moved to an opened position.

24. A disc drive arrangement for accessing information from a recording information onto a disc retained in a cartridge comprising:
a housing;
a door;

means for mounting the door to the housing so that the door can be moved between an opened and a closed position;
at least one head;
a carriage means for mounting and transporting said head;
means for movably mounting said head to said carriage;
means for movably mounting said carriage to said housing;
motor means for positioning said carriage relative to said housing;
spindle means for receiving and driving the disc;
means fro receiving said cartridge;
linkage means for operatively connecting said receiving means to door;
said receiving means includes means for urging said disc onto said spindle means and then urging said cartridge away from say spindle means as said door is closed.

* * * * *

UNITED STATES PATENT AND TRADEMARK OFFICE
CERTIFICATE OF CORRECTION

PATENT NO. : 4,504,879
DATED : March 12, 1985
INVENTOR(S) : Toldi George et al.

It is certified that error appears in the above-identified patent and that said Letters Patent is hereby corrected as shown below:

Title page, line [54], title should read --DISC DRIVE ARRANGEMENT WITH DOOR ACTUATED MAGNETIC HEAD MOVEMENT LINKAGE--.

Column 1, title should read --DISC DRIVE ARRANGEMENT WITH DOOR ACTUATED MAGNETIC HEAD MOVEMENT LINKAGE--.

Column 8, line 63, before "moved" insert --of said head and said disc relative to each other as the door is--.

Column 8, line 65, before "recording" change "a" to --and--.

Column 10, line 4, change "fro" to --for--.

Column 10, line 9, change "say" to --said--.

Signed and Sealed this

Twenty-seventh Day of August 1985

[SEAL]

Attest:

DONALD J. QUIGG

Attesting Officer   Acting Commissioner of Patents and Trademarks